Oct. 23, 1928.

F. E. GREENE 1,688,706

DUST SPRAYER

Filed July 20, 1926.

INVENTOR.
FRED E. GREENE

BY
*Townsend, Loftus & Hiett*
ATTORNEYS.

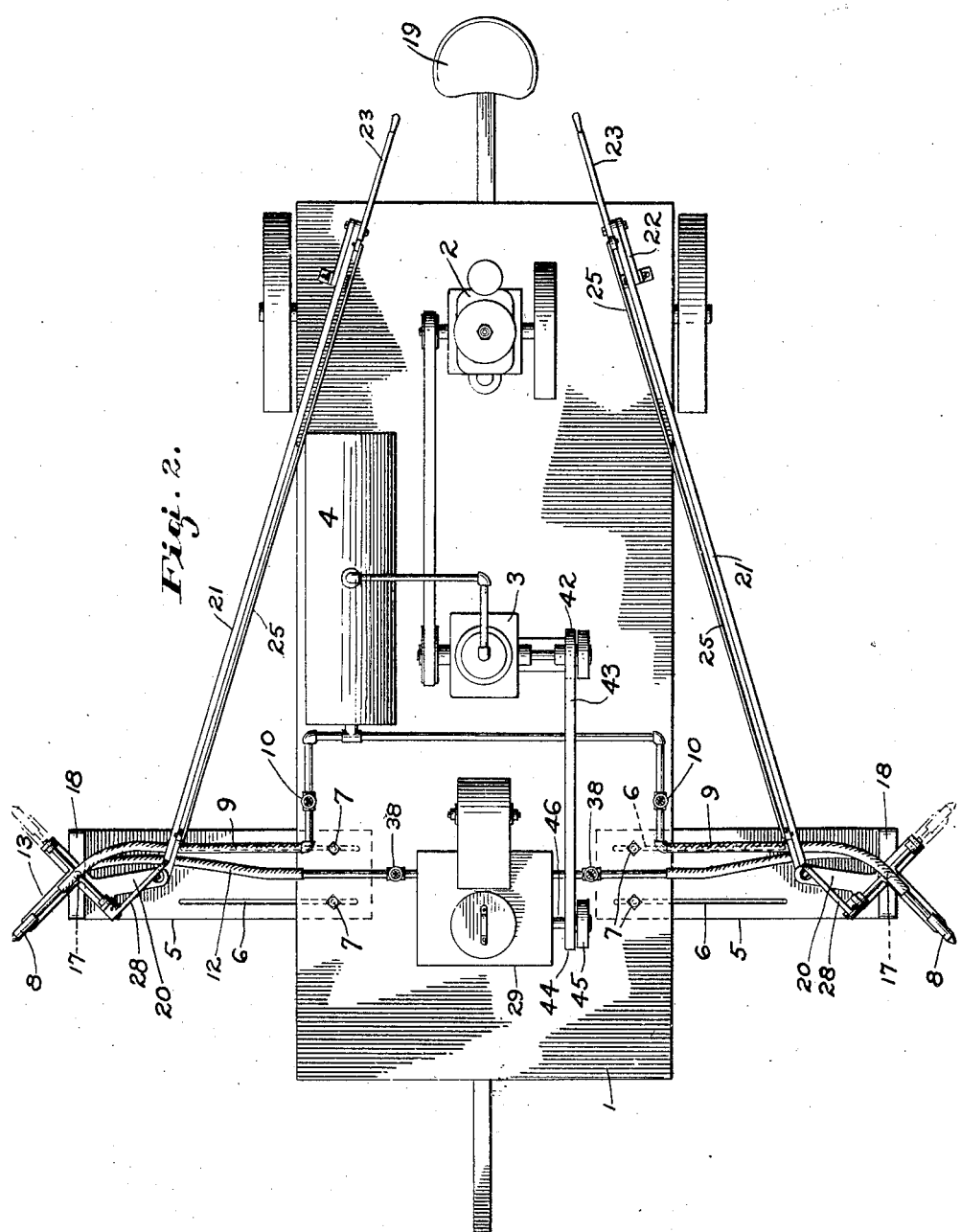

Oct. 23, 1928.
F. E. GREENE
1,688,706
DUST SPRAYER
Filed July 20, 1926  3 Sheets-Sheet 3
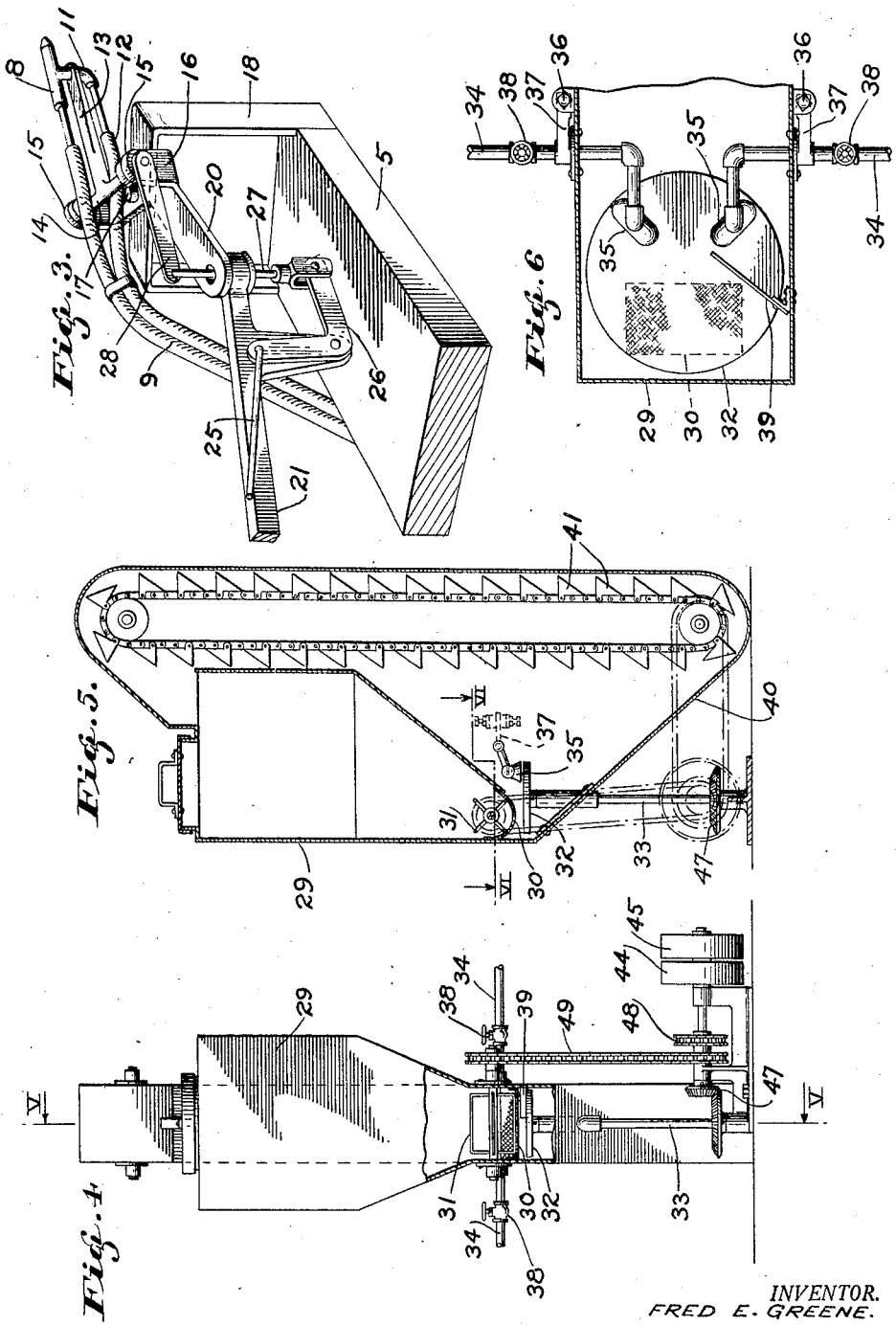
INVENTOR.
FRED E. GREENE.
BY
ATTORNEYS.

Patented Oct. 23, 1928.

1,688,706

UNITED STATES PATENT OFFICE.

FRED E. GREENE, OF BERKELEY, CALIFORNIA, ASSIGNOR TO A. B. HUMPHREY CO., OF PERKINS, CALIFORNIA, A CORPORATION OF CALIFORNIA.

DUST SPRAYER.

Application filed July 20, 1926. Serial No. 123,635.

This invention relates to dust spraying machines adapted for use in spraying plants to destroy insects thereon and it is the primary object of the invention to provide an improved machine for this purpose.

I preferably construct my improved machine in a manner adapting the same to travel between two rows of plants to be sprayed, and with a spraying nozzle on each side thereof adapted to direct the spraying dust onto the plant. The nozzles are preferably mounted in an adjustable manner adapting the same to be properly spaced to reach the plants. When any breeze is blowing, more efficient spraying is obtained if the dust is directed in the direction of the breeze. I therefore provide means for adjusting the nozzles so that the dust may always be so directed.

The nozzles are furthermore mounted to be moved in a manner directing the dust upwardly and downwardly over the entire plant and these movements of the nozzles are preferably operated from a seat located between and behind the nozzles. It is a further object of my invention to provide an improved mechanism having these novel features.

My improved sprayer also embodies a movable continuous dust support and suction heads co-operating therewith and adjustable relative thereto in a manner varying the amount of dust sucked therefrom. The two nozzles above mentioned are connected to these heads. A uniform amount of dust is sifted from a container onto the support and after the support leaves the heads the remaining dust is scraped therefrom whereby only the uniform layer of dust sifted onto the support is brought to the suction heads. Thus the amount of dust fed to the two nozzles can be accurately controlled. It is another object of my invention to provide an improved spraying machine embodying these novel features.

In the accompanying drawings I have illustrated certain specific embodiments of my invention, but it will be understood that the invention can be otherwise embodied and that the drawings are not to be construed as defining or limiting the scope of the invention. The claims appended to the specification being relied upon for that purpose.

Referring to the figures of the drawings:

Fig. 2 is a plan view thereof.

Fig. 3 is an enlarged detail view of the nozzle mechanism.

Fig. 4 is an end view of the dust container and sifting mechanism partly in section.

Fig. 5 is a sectional view therethrough on line V—V.

Fig. 6 is an enlarged detail view taken approximately on line VI—VI.

Figure 1:
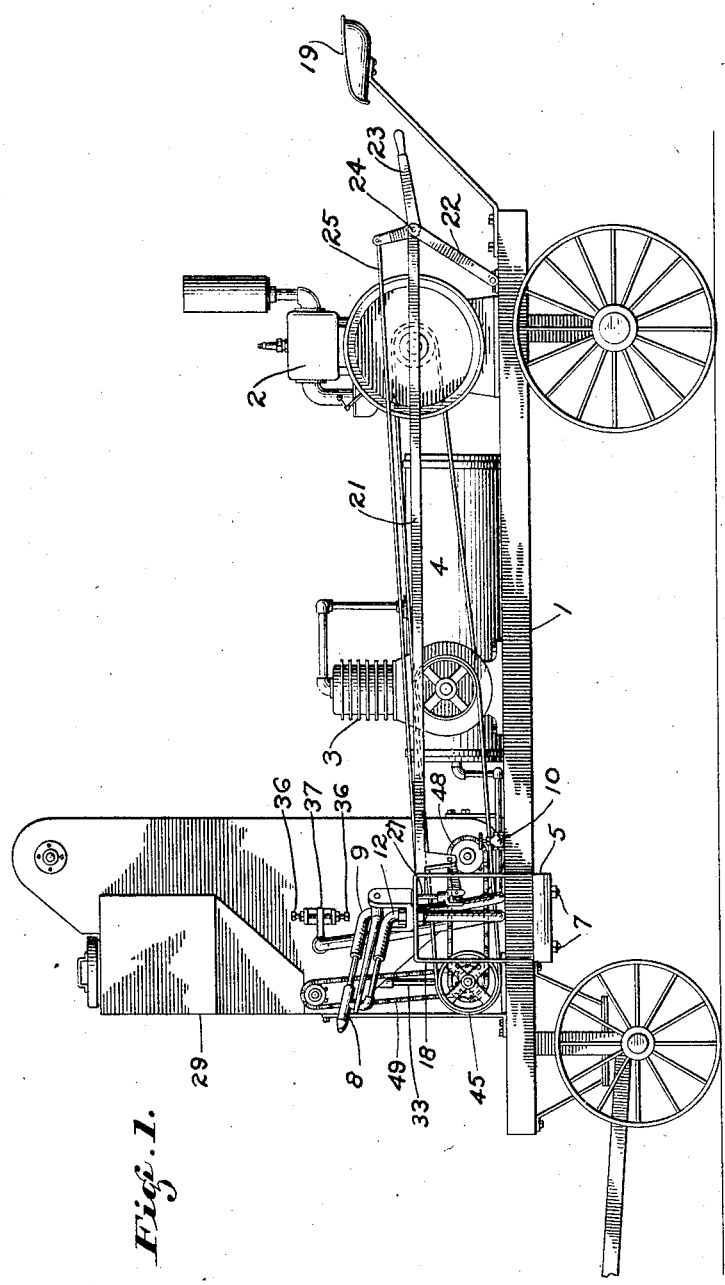
Fig. 1 is a side elevation of my improved machine.

In the drawing, 1 indicates a chassis support on which is mounted an engine 2, an air compressor 3, driven thereby, and a compressed air tank 4. The two spraying nozzles on opposite sides of the machine are respectively mounted on supports 5 carried on the chassis and adjustable for width by means of slots 6 and bolts 7.

Each sprayer nozzle comprises a Venturi-like tube 8 having an air connection 9 to the compressed air tank, the air being controlled by a valve 10. Dust is delivered to the tube through a side connection 11 and the hose 12 from the dust-spraying mechanism hereinafter described. The tube 8 is carried by a supporting arm 13 on a horizontal pivot 14. This pivot is carried by two upwardly extending lugs 15 on a member 16. This member is movable on a vertical pivot 17 on a member 18 on the support 5.

An operator's seat 19 is preferably located in a position between and rearwardly of the nozzles and both the vertical and horizontal movements of the nozzles are preferably controlled therefrom. An arm 20 on each member 16 is connected by a long link 21 to a supporting link 22 pivoted to the chassis adjacent the seat. It will be noted that endwise movement of this link 21 will move the member 16 about its vertical pivot in a manner directing the nozzle tube 8 forwardly and backwardly.

A hand lever 23 pivoted to the links 21 and 22 at 24 is connected by a rod 25 to one arm of a bell crank 26 having its other arm connected by a link 27 to an arm 28 on the horizontal pivot 14. It will, therefore, be seen that movement of the hand lever 23 about its pivot will move the tube supporting arm 13 about its horizontal pivot in a manner directing the nozzle tube 8 upwardly and downwardly.

The dust supplying mechanism comprises a dust container or hopper 29 having a sifter in its lower restricted end comprising a screen 30 and a rotary member 31 co-operating therewith. This sifter is adapted to sift the dust onto a rotary plate 32 on a vertical shaft 33. Each of the two dust pipes 34 has a suction head 35 thereon disposed over the plate. Means, including set screws 36 and arms 37, are provided outside the container casing for adjusting the heads toward and from the plate, the amount of dust sucked from the plate depending on the proximity of the mouth of the head to the plate. A dust controlling valve 38 is provided in each pipe 34.

A scraper 39 is provided between the heads and sifter where by the dust remaining on the plate after it leaves the heads is scraped therefrom before that portion of the plate again passes beneath the sifter. This dust falls down into the casing 40 from whence it is carried by a bucket conveyor 41 to the hopper 29.

The dust spraying mechanism is driven from a pulley 42 on the compressor shaft. A belt 43 connects this pulley with tight and loose pulleys 44 and 45 on a shaft 46. This shaft is connected to the vertical shaft 33 through bevel gears 4.

The conveyor 41 and sifter 31 are driven from the shaft 46 through belts 48 and 49.

The operation of my machine is substantially as follows:

The nozzle supports 5 are first adjusted to a width adapted to spray the two rows between which the machine is to travel. As the machine travels along, the operator on the seat 19 moves the hand levers 23 up and down in a manner moving the nozzles up and down to properly spray all parts of the plants vertically. If a breeze is blowing in the direction of travel of the machine, the nozzles are headed forwardly as shown in Fig. 2, or if the breeze is blowing in the opposite direction, the nozzles are headed rearwardly. When the end of the row is reached and the machine starts on its return, the operator directs the nozzles in the opposite direction (in the direction of the breeze) merely by moving the hand lever 23, this movement acting through the link 21 to move the member 16 about its pivot 17.

The amount of dust delivered to each nozzle is regulated by adjusting its suction head 35 toward or from the plate 32 and by adjusting the valves 38. The scraper 39 cleans the plate before it passes beneath the sifter 30 and a uniform layer of dust on the plate is therefore passing beneath the suction heads at all times.

It should also be noted that the continuous suction of air by the nozzles 35 creates a condition wherein the space adjacent the upper surface of the plate 32 is under less than atmospheric pressure. The particles of dust on the plate therefore tend to expand and separate and are more easily picked up by the nozzles and carried along in a stream of air under less than atmospheric pressure. This action aids considerably in breaking up the dust and spraying the same uniformly. In the dust spraying machines heretofore known, air pressure instead of a vacuum has been used. Instead of expanding and separating the dust particles as in applicant's machine, this air pressure has acted to compress the dust and thereby render the same less sprayable.

Having thus described my invention, what I claim and desire to secure by Letters Patent is:

1. In a dust sprayer, the combination of a movable continuous support, means for continuously moving the support, a dust container above the support, means for sifting dust from the container onto the support as the support travels therebeneath, and a suction pipe having a suction head adjacent the support with the mouth thereof so closely adjacent the support as to suck the dust therefrom.

2. In a dust sprayer, the combination of a movable continuous support, means for continuously moving the support, a dust container above the support, means for sifting dust from the container onto the support as the support travels therebeneath a suction head adjacent the support, and means between the head and sifting means for scraping the remaining dust from the support after the same leaves the head.

3. In a dust sprayer, the combination of a movable continuous support, means for continuously moving the support, a dust container above the support, means for sifting dust from the container onto the support as the support travels therebeneath, a suction pipe having a suction head adjacent the support, and means for adjusting the head to vary the proximity of the mouth thereof to the support whereby to vary the amount of dust sucked from the support.

4. In a dust sprayer, the combination of a horizontal rotary plate, means for continuously rotating the plate, a dust container above the plate, means for sifting dust from the container onto the plate as the plate rotates therebeneath, a suction pipe having a suction head adjacent to the plate with the mouth thereof so closely adjacent to the plate as to suck the dust therefrom, and means for adjusting the head toward and from the plate.

5. In a dust sprayer, the combination of a movable continuous support, means for continuously moving the support, a dust container above the support, means for sifting dust from the container onto the support as the support travels therebeneath, means for removing a portion of the dust delivered to the support, and means for removing the remaining dust and returning the same to the dust container.

6. In a dust sprayer, the combination of a movable continuous support, means for continuously moving the support, a dust container above the support, means for sifting dust from the container onto the support as the support travels therebeneath, a pair of suction pipes each having a suction head adjacent the support, means for individually adjusting the heads to vary the proximity of the mouths thereof to the support whereby to vary the amount of dust sucked from the support, means to produce an air blast, a pair of blast pipes connected to the blast producing means, a pair of spraying nozzles respectively connected to the blast pipes, and a connection between the vacuum pipes and the blast pipes whereby vacuum is produced by the blast in the vacuum pipes.

FRED E. GREENE.